United States Patent [19]

Lippert et al.

[11] Patent Number: 5,727,040

[45] Date of Patent: Mar. 10, 1998

[54] FUEL ASSEMBLY FOR A BOILING WATER REACTOR WITH ADJUSTABLE BY-PASS

[75] Inventors: Hans-Joachim Lippert, Höchstadt; Werner Meier, Kunreuth, both of Germany

[73] Assignee: Siemens Aktiengesellschaft, Munich, Germany

[21] Appl. No.: 599,780

[22] Filed: Feb. 12, 1996

Related U.S. Application Data

[63] Continuation of PCT/DE94/00894, Jul. 29, 1994.

[30] Foreign Application Priority Data

Aug. 11, 1993 [DE] Germany ............... 43 27 001.8

[51] Int. Cl.⁶ .................................................. G21C 3/322
[52] U.S. Cl. .......................... 376/443; 376/352; 376/434
[58] Field of Search .................................. 376/352, 434, 376/443, 444

[56] References Cited

U.S. PATENT DOCUMENTS

| | | | |
|---|---|---|---|
| 3,053,746 | 9/1962 | Challender et al. | 376/352 |
| 3,715,274 | 2/1973 | Venier et al. | 376/444 |
| 4,032,398 | 6/1977 | Cross et al. | 376/443 |
| 4,035,233 | 7/1977 | Williamson et al. | 376/444 |
| 5,289,514 | 2/1994 | Lippert et al. | 376/444 |
| 5,327,471 | 7/1994 | Meier et al. | 376/444 |
| 5,339,342 | 8/1994 | Meier et al. | 376/446 |

FOREIGN PATENT DOCUMENTS

| | | |
|---|---|---|
| 0550868 | 7/1993 | European Pat. Off. . |
| 2620343 | 11/1976 | Germany . |
| 3150477 | 8/1982 | Germany . |
| 3440637 | 5/1985 | Germany . |
| 2091932 | 1/1981 | United Kingdom . |

*Primary Examiner*—Daniel D. Wasil
*Attorney, Agent, or Firm*—Herbert L. Lerner; Laurence A. Greenberg

[57] ABSTRACT

In a foot of a fuel assembly of a boiling water reactor, an upper edge of a transition member is tight against a lower edge of a fuel assembly casing to substantially prevent bypass flow between them. Rather, bypass apertures are provided therefor over all sides of the fuel assembly casing. In a first position of a base plate lying on the transition member, the bypass apertures on some sides are blocked by lateral surfaces of the base plate, while in a second position of the base plate, the bypass apertures of other sides are blocked. The direction of the bypass flow can thus be predetermined regardless of the position of the fuel assembly casing.

13 Claims, 4 Drawing Sheets

FUEL ASSEMBLY FOR A BOILING WATER REACTOR WITH ADJUSTABLE BY-PASS

Cross-Reference to Related Application

This application is a Continuation of International Application Ser. No. PCT/DE94/00894, filed Jul. 29, 1994.

BACKGROUND OF THE INVENTION

1. Field of the Invention

The invention relates to a fuel assembly for a boiling water reactor. Such fuel assemblies are surrounded by a casing with open ends at the top and bottom, and the casing has a cross section which is square or at least in the form of a rotationally symmetrical regular polygon. The inside of the lower end of the casing is engaged from below by the upper part of a transition member, which tapers in funnel-like fashion to form an inlet at the lower end. The upper end of the transition member carries a base plate, which covers the lower open end of the casing and has flow apertures for a coolant, such as water.

Seated on the upper end of the fuel assembly is a head piece, with a handle and a cover plate, which likewise has flow apertures for coolant, especially water, and covers the open upper end of the casing. A cluster of fuel rods is retained between the base plate and the cover plate.

Often a water channel, for instance one or more tubes, is disposed approximately in the middle of the fuel assembly. A tube with a square cross section, which occupies the space of a plurality of fuel rods, is advantageously used as the water channel.

The coolant emerges from a grid plate on the bottom of the reactor core and enters the fuel assembly through the inlet at the lower end of the funnel-like transition member. It then flows in the interior of the fuel assembly casing along the fuel rods as far as the cover plate, where it largely escapes in the form of steam. Some of the water can flow through the water channel without evaporating, so that liquid water is available as a moderator to the upper portion of the fuel assembly as well.

Due to the flow resistance in the interior of the casing, the water flowing through the casing suffers a considerable pressure loss and thus emerges from the fuel assembly at a reduced pressure. That reduced pressure also prevails in the interstices between the individual fuel assemblies of the reactor core, so that between the interior of the casing and the exterior of the casing a pressure difference occurs which bends the casing walls outward. The walls can gradually lose their stability under the influence of the neutron flux during reactor operation. As a result, gaps between the transition member and the lower edge of the fuel assembly casing can also occur, through which some of the coolant introduced into the transition member can escape, and as a result the flow conditions can gradually change during reactor operation.

In principle, that kind of bypass flow, which emerges from the transition member between the transition member and the lower edge of the fuel assembly casing, is unavoidable unless those parts rest entirely tightly against one another. The bypass flow is even desirable for bringing liquid moderator from outside to the upper portion of the fuel assemblies through the interstices between the individual fuel assembly casings as well. Moreover, a pressure equilibrium is attained in this way, which prevents excessive deformation of the casings. However, the bypass flow must be stabilized and adjusted, if desired flow conditions are to be attained inside the fuel assembly itself. For that reason, broad leaf springs are often provided on the base plate or on lower end pieces of fuel assemblies that are retained on the base plate. The leaf springs are supported on the fuel assembly casing or on the transition member or base plate, and by virtue of their elasticity they adapt themselves to the unavoidable gap between those parts, or in other words they block off the bypass aperture in a controlled fashion.

However, such sealing springs are small parts, which have to be inserted separately during assembly and can break off or be lost when inspection work is performed. Different, simpler constructions for adjusting a defined bypass flow are therefore desirable.

Depending on the location of the fuel assembly in the reactor core and on the position of the control rods which are disposed between certain fuel assemblies inside the reactor core, it may be desirable to carry the bypass flow out of the fuel assembly only from certain sides, or in other words to impose a desired, defined asymmetry of flow upon the coolant flowing between the fuel assemblies.

An undesired flow asymmetry arises because the fuel assembly casings can also bend asymmetrically during reactor operation, depending on their particular location. Such bending can be compensated for if, for instance, the location of the fuel assembly and its casing is changed after a certain service time, such as if the fuel assembly is rotated or moved to a location where a different fuel assembly was previously located, so that the bending then proceeds in the opposite direction from the bending that had already occurred. As a result, the influence of the bending on the service life of the fuel assembly casing can be reduced, and the casing of a fuel assembly can, for instance, be used for new fuel assemblies when consumed fuel rods are replaced. However, the new location of the fuel assembly and its casing cannot be chosen exclusively from the standpoints of casing bending, since with the new location, the direction of the bypass flow is changed as well.

SUMMARY OF THE INVENTION

It is accordingly an object of the invention to provide a fuel assembly for a boiling water reactor with an adjustable bypass, which overcomes the hereinafore-mentioned disadvantages of the heretofore-known devices of this general type and which assures a defined bypass flow despite having the simplest possible structure.

According to an object of the invention, a fuel assembly is to be created that keeps a change in the bypass flow emerging from the transition member into the exterior of the fuel assembly casing practically constant even if the walls of the casing bulge during reactor operation and if no sealing spring is used to largely seal off a gap between the transition member and the lower edge of the fuel assembly casing.

According to another object of the invention, it is to be possible to specify the orientation of the fuel assembly casing relative to the direction of the neutron flux, the location of control elements, or other directions predetermined by the reactor core geometry, regardless of the side of the fuel assembly from which the bypass flow is carried out of the fuel assembly.

According to a further object, a fuel assembly is to be created which includes a "boiler", formed by the casing and the transition member, and a "skeleton" inserted into the boiler and carrying the fuel rods, but in which the sides of the boiler through which the bypass flow is carried out can be specified regardless of the orientation of the fuel assembly casing.

With the foregoing and other objects in view there is provided, in accordance with the invention, a fuel assembly for a boiling water reactor, comprising an encompassing casing having open upper and lower ends and having a square or rotationally symmetrical regular polygonal cross section with walls defining sides; a transition member having a lower end tapering like a funnel to form an inlet, having an upper edge engaging the lower end of the casing from below and having an interior, the transition member being secured to the lower end of the casing on all of the sides and defining a flow channel between the wall of the casing and the transition member; an insert protruding into the casing from the upper end of the casing as far as the transition member, the insert having: a coolant channel or water tube with upper and lower ends, a head piece with a handle to which the upper end of the coolant channel is secured in load-bearing fashion and with a cover plate retained on the handle and/or the coolant channel, a perforated base plate being secured to the lower end of the coolant channel, being seated on the upper edge of the transition member and having lateral surfaces, and a bundle of fuel rods retained between the base plate and the cover plate; and each of the sides of the casing having at least one lateral bypass aperture formed therein below the base plate, the bypass aperture in at least one of the sides communicating with the interior of the transition member through the flow channel and the bypass aperture in at least another of the sides being blocked by one of the lateral surfaces of the base plate.

The head piece, water tube and base plate accordingly form a skeleton that can be inserted into the casing, is seated on the transition member and in which moreover lattice-like spacers can be secured to the water tube in various axial positions. As long as the head piece has been removed from the skeleton, fuel rods can be inserted through the meshes of the spacers.

In accordance with another feature of the invention, the base plate can rest through support feet on the upper edge of the transition member, at least one support foot has a recess for forming the flow channel, and at least another support foot has the lateral surface for blocking the bypass.

In accordance with a further feature of the invention, each side of the casing has a bypass aperture in the vicinity of its center line.

In accordance with an added feature of the invention, the upper edge of the transition member has contact surfaces, and each of the sides of the casing is virtually tightly connected to a respective one of the contact surfaces.

The fastening between the respective casing side and the corresponding side of the transition member assures that a substantial gap, which would represent an additional bypass aperture between the transition member and the casing wall, will not form there even if the casing bulges during reactor operation. This fastening can advantageously be disconnectable and can be made approximately in the center line of the respective casing wall.

In accordance with an additional feature of the invention, a screw which is provided for this purpose connects the respective casing wall to a contact surface on the side of the transition member.

In accordance with again another feature of the invention, this kind of construction, in which a skeleton that carries the fuel rods is inserted into a boiler formed by the transition member and the casing, is especially advantageous in the case of tubular water channels (especially water channels of square cross section), which are surrounded on all sides by fuel rods of the cluster or in other words are located approximately in the middle of the fuel assembly.

With the objects of the invention in view, there is also provided a fuel assembly for a boiling water reactor, comprising a cluster of fuel rods; a rotationally symmetrical polygonal casing surrounding the cluster of fuel rods and having an open lower end, walls and an exterior; a transition member having an interior, an exterior, a lower end tapering to form an inlet, an upper part engaging the open lower end of the casing from below, and bearing or lateral contact surfaces resting virtually form-lockingly against all of the walls of the casing; a head piece having a perforated cover plate and covering the open upper end of the casing above the cluster of fuel rods; a perforated base plate (having flow apertures for the coolant) adjacent the upper edge of the transition member covering the open lower end of the casing below the fuel rods; and at least one lateral flow aperture in one or both of the casing and the transition member guiding a bypass flow from the interior of the transition member to the exterior of the casing and of the transition member, for virtually sealing off a part of the walls of the casing from the transition member and permitting only another part of the walls of the casing to be traversed by the bypass flow. In other words, at least one casing side opposite the transition member is sealed off, while at least one other side has the flow apertures for the bypass flow and is passable. It is noted that a form-locking connection is one which connects two elements together due to the shape of the elements themselves, as opposed to a force-locking connection, which locks the elements together by force external to the elements.

In accordance with another feature of the invention, the walls of the casing are secured, in particular disconnectably (by being screwed on, for instance), at their lower ends to the contact surfaces of a transition member, in such a way that the edge of the casing is practically or virtually sealed off, or at least there is only a gap that remains largely constant between the casing edge and the transition member, even if the casing bulges.

In accordance with a further feature of the invention, all of the casing walls have flow apertures, but some of the flow apertures are blocked by outer surfaces of the transition member resting on the casing walls or by downward-protruding projections of the base plate.

In accordance with a concomitant feature of the invention, in a first relative position between the casing and the transition member some of the flow apertures are blocked off, and in another relative position, which is determined by a relative angle dictated by the symmetry of the fuel assembly, a different group of flow apertures is blocked off.

Other features which are considered as characteristic for the invention are set forth in the appended claims.

Although the invention is illustrated and described herein as embodied in a fuel assembly for a boiling water reactor with an adjustable by-pass, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
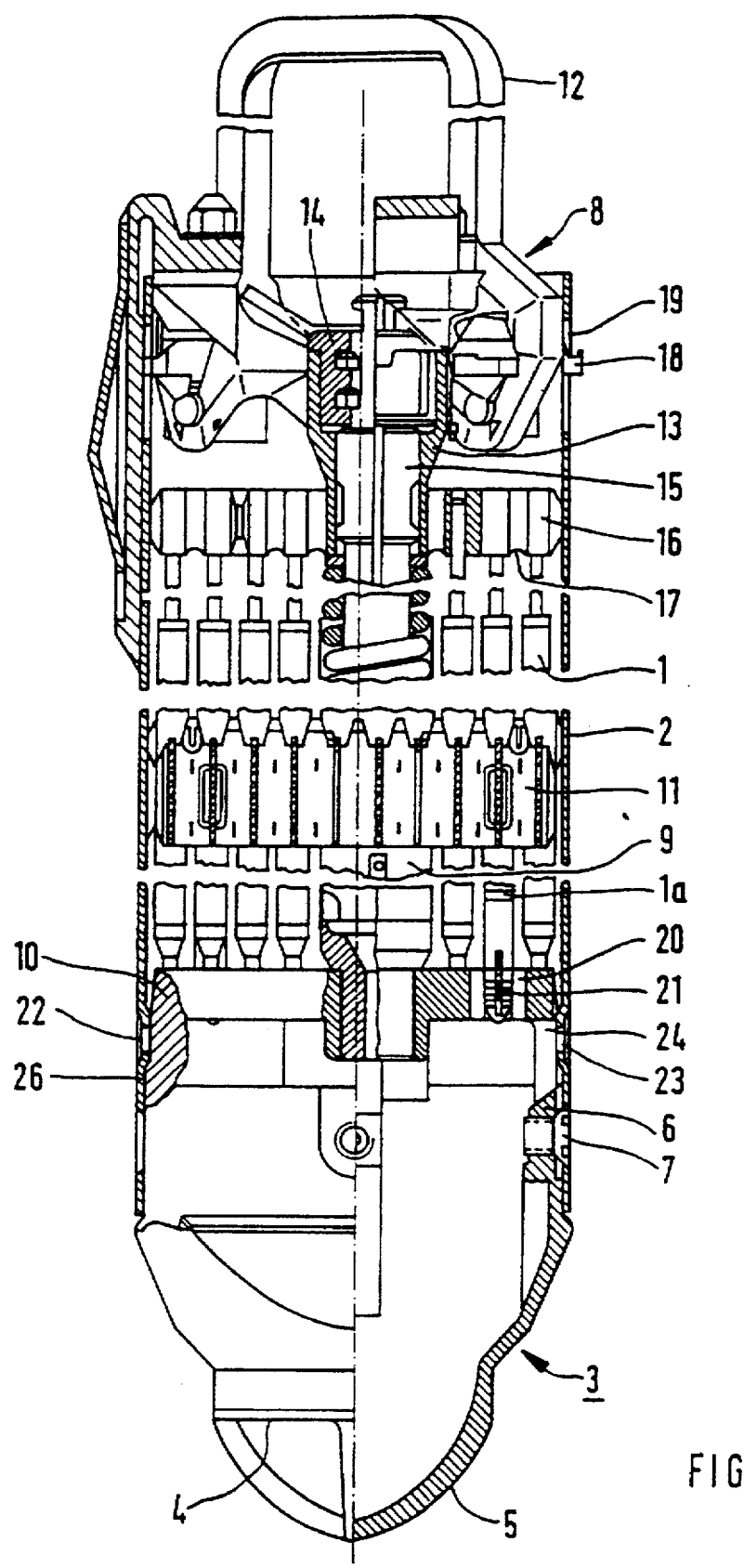
FIG. 1 is a diagrammatic, side-elevational view of a fuel assembly of the invention, in which a casing wall has been largely cut away in order to show an internal layout of the fuel assembly.

Referring now to the figures of the drawing in detail and first, particularly, to FIG. 1 thereof, there is seen an exemplary embodiment of a fuel assembly of the invention which is constructed on the skeleton principle, as is described in International Patent Application PCT/DE91/00168, corresponding to U.S. Pat. No. 5,327,471. In the fuel assembly, a casing 2 that surrounds fuel rods 1 forms a boiler, with a transition member 3 acting as a bottom of the boiler.

This transition member 3 has a funnel-like lower end with a circular inlet 4 for water. The fuel assembly is inserted into corresponding apertures in a lower core lattice through the use of ribs 5 which curve over the inlet 4 and are disposed in a star. An upper edge 6 of the transition member 3 is constructed as a contact surface, which virtually form-lockingly engages an inner surface of an open lower edge of the fuel assembly from below and is screwed there to surfaces of the square casing 2 by screws 7. These screws hold the transition member and the fuel assembly casing virtually tightly together even if an upper region of the fuel assembly casing bulges into the exterior of the casing because of flow resistance in the interior of the fuel assembly and a resultant overpressure.

No sealing spring is therefore required between the transition member 3 or a base plate 10 in order to elastically fill out any possible gap and largely block it to the bypass flow.

An insert having a skeleton which includes a head piece 8, an approximately central water tube 9 serving as a coolant duct or channel and the base plate 10, is inserted into this boiler 2. The water tube 9 also has lattice-like spacers 11 having meshes or openings in which the fuel rods 1 are braced.

The head piece 8 is constructed as described in Published International Patent Application WO 95/04992, and it includes a handle 12 with a carrying sleeve 13, into which an extension 15 of the water tube 9 extends engagingly. Through the use of a terminal nut, a sleeve 14 of a bayonet mount, or some other stop, the extension 15 of the coolant tube is secured in a load-bearing fashion to the sleeve 13 of the handle 12, as described in German Published, Non-Prosecuted Patent Application DE 42 40 537 A1. A cover plate 16 having flow apertures 17 is retained at this connection between the handle 12 and the water tube 9.

Latches or locks 18 are also supported in the handle and reach through windows 19 in an upper edge of the casing 2, as is described in German Published, Non-Prosecuted Patent Application DE 42 12 645 A1, generally corresponding to Published European Application 0 550 868 A1 and U.S. Pat. No. 5,339,342, in order to create a redundant load-bearing structure and to make it possible to lift the fuel assembly by the handle 12 even if the water tube 9 might be broken.

The base plate 10 has flow apertures 20 for the coolant which may be made, for instance, by electrochemical removal of material as is described in European Patent Application 92 100065.9, corresponding to co-pending U.S. patent application Ser. No. 08/314,960, filed Sep. 29, 1994.

The base plate 10 is secured in load-bearing fashion to a lower end of the water tube 9. A screwed-in base 21 can be seen, on which fuel rods 1a having a length that is only a fraction of the normal fuel rod length, can be retained. The fastening of the water tube 9, the base 21 and possibly the fuel rods 1 to the base plate may be carried out as described in Published International Patent Application WO92/05565.

All four sides of the fuel assembly casing have bypass apertures 23 below the base plate 10, while the base plate has projections that protrude downward and serve as support feet for bracing the base plate 10 on the upper edge 6 of the transition piece 3. The left-hand portion of FIG. 1 shows that the base plate 10 rests with these projections virtually form-lockingly on the left-hand wall of the fuel assembly casing 2, thus closing off the corresponding bypass aperture 23. However, a corresponding support foot 26 that contacts the right-hand casing wall has a slit at this point, creating a flow channel 24 that connects the bypass aperture 23 to the interior of the transition member 3.

The insert, which is formed of the handle, the water tube, the cover plate, the base plate and the fuel rods, can therefore be lifted out of the boiler, after unlocking of the latch 18 by rotating through 180 degrees, for instance, and re-inserted. While in the previous position the bypass flow was carried to the right out of the fuel assembly casing, in the new position it flows to the left.

Figure 2:
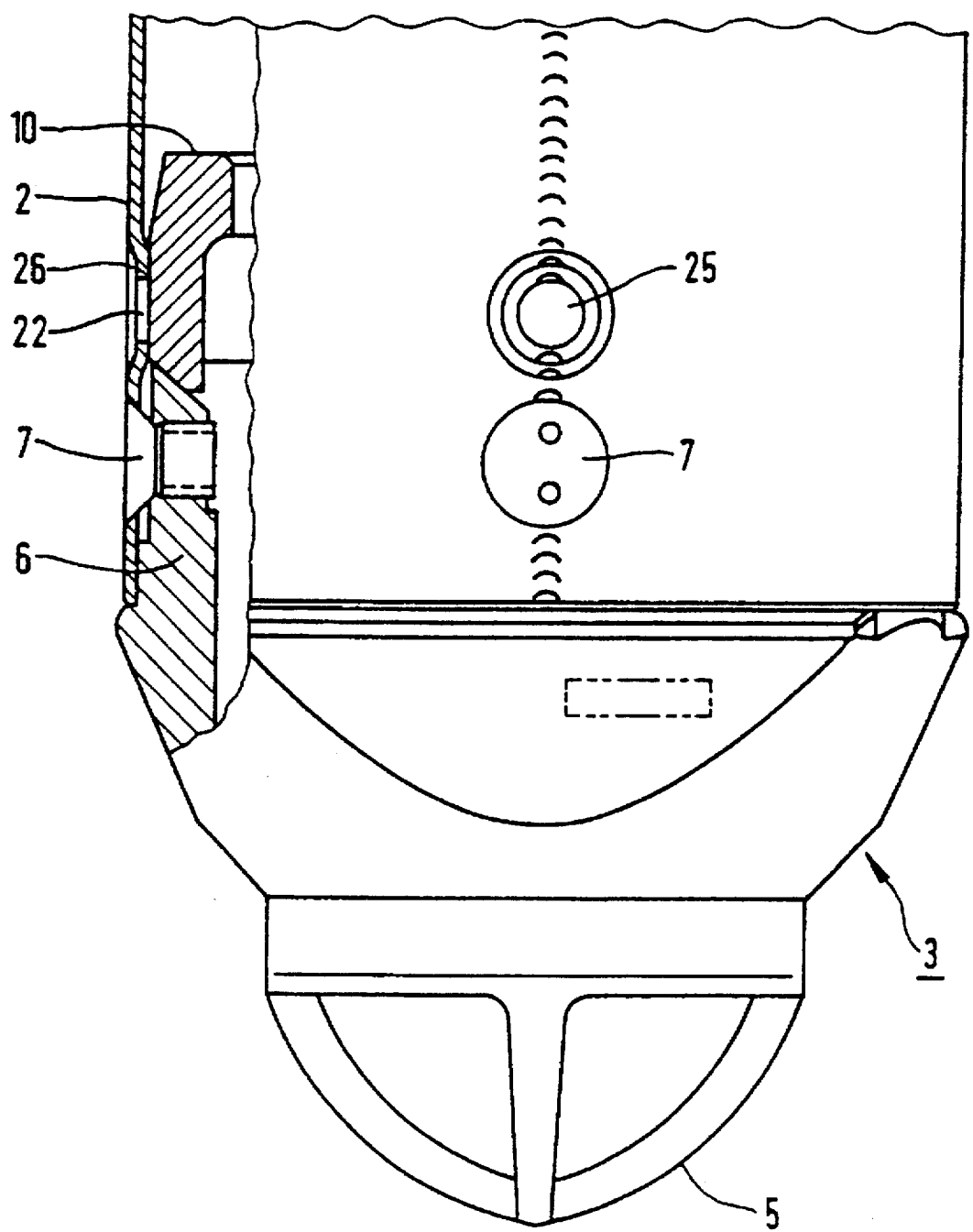
FIG. 2 is an enlarged, fragmentary, side-elevational view of a lower end of the fuel assembly, which is broken away to show a cross section on the left-hand side.

FIG. 2 shows a bypass aperture 25 and a screw 7 on the front side facing toward the observer, which are located approximately along a center line of this side of the casing. The left-hand side also shows a screw 7, which keeps the corresponding lower edge of the fuel assembly casing 2 on the upper edge of the transition member 3, or on a bearing surface of the edge 6 thereof. Moreover, a bypass aperture 22 of the left-hand casing wall is shown, but it is blocked by a lateral surface of a support foot 26 on the lower surface of the base plate 10.

Figure 3:
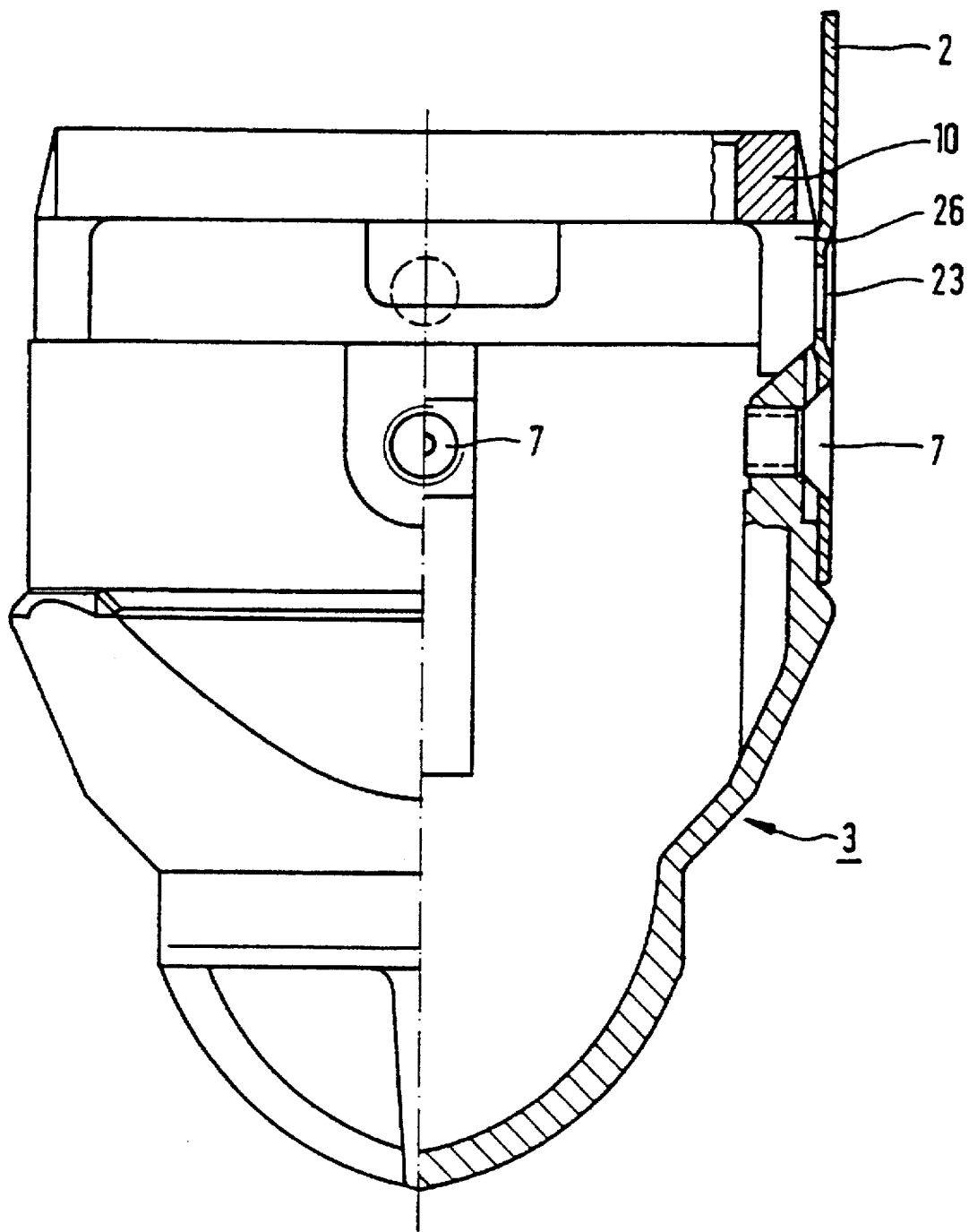
FIG. 3 is a view similar to FIG. 2, which is broken away to show a cross section on the right-hand side.
Figure 4:
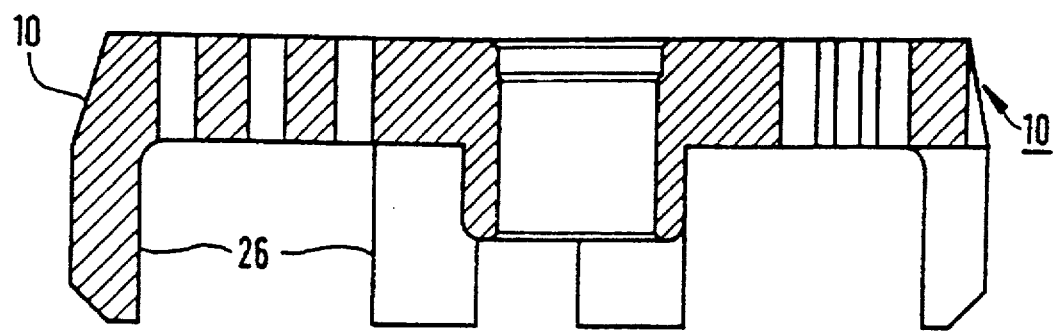
FIG. 4 is a longitudinal-sectional view of a base plate.

On the right-hand side, however, and as FIG. 3 shows, the corresponding bypass aperture 23 leading to the interior of the transition member 3 communicates with a flow channel that is formed by a slit in the support foot 26. FIG. 4 more clearly shows the left-hand support foot, which is not slit and which blocks the bypass aperture of the left-hand side of the casing, while the support foot 26 on the right-hand side is slit and forms the flow channel 24, as is clearly shown in FIG. 5.

Figure 5:
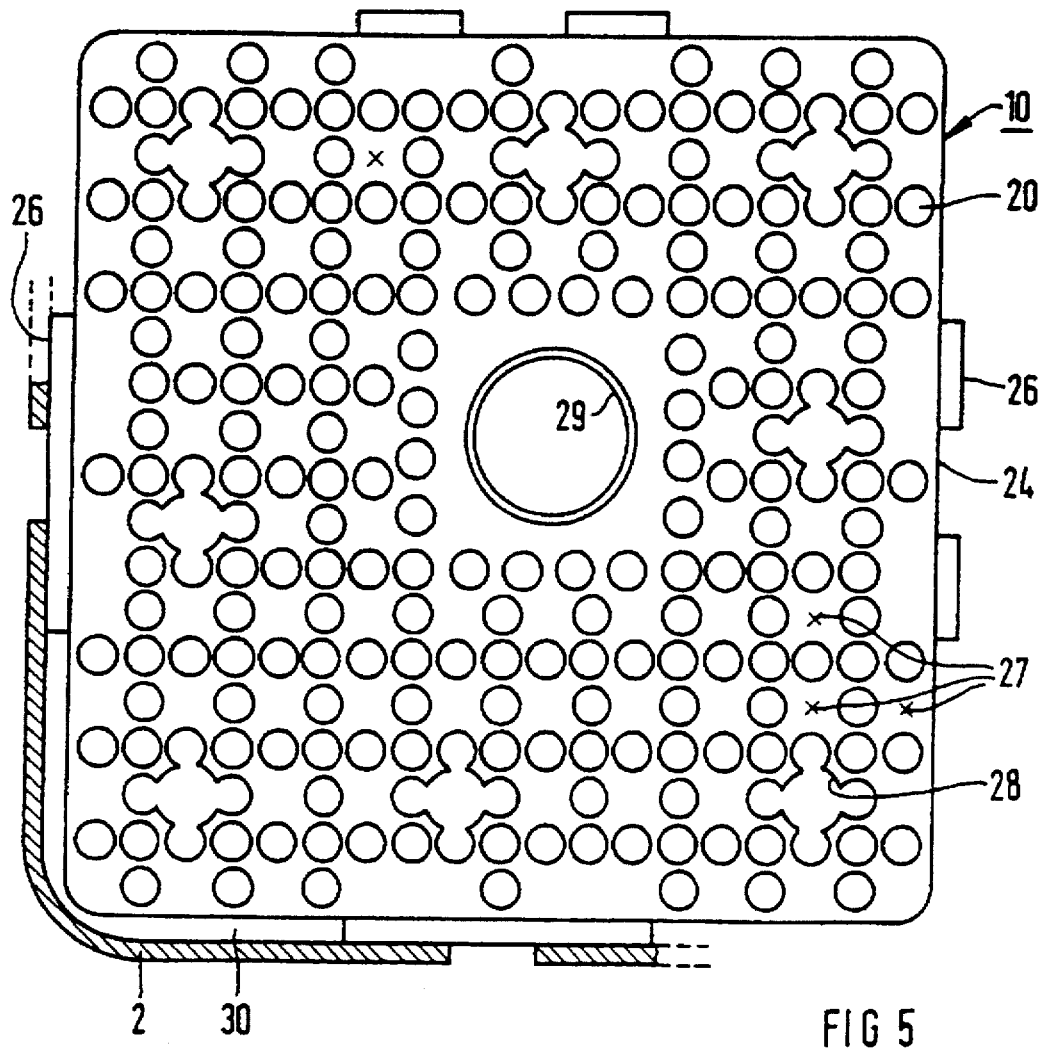
FIG. 5 is a plan view of the base plate.

The flow apertures 20 in the base plate 10, which are disposed between positions 27 for the fuel rods, are also clearly visible in FIG. 5. Positions 28 can also be seen at which the bases 21 are provided for the aforementioned fractional-length fuel rods 1a. Since this structure involves a fuel assembly having 91 fuel rods, which are disposed in 10 rows and 10 columns, the coolant tube 9, having an open lower end which protrudes tubularly into an aperture 29 in the base plate 10 and occupies the position of 3×3 fuel rods, cannot be located precisely in the middle of the fuel assembly.

In FIG. 5, the left front corner of the (otherwise cut away) fuel assembly casing 2 is also shown. A gap 30 that results between the base plate 10 and this fuel assembly casing is largely sealed off from the interior of the transition member 3 by the upper edge 6 of the transition member 3, which in this case engages the inner surface of the fuel assembly casing virtually form-lockingly (that is, without forming a significant interstice).

The insert having the base plate, which in one position uncovers certain bypass apertures that it blocks in another position, can also be assembled in another way. Moreover, the essence of the invention, namely the use of a solid, preferably disconnectable connection to seal off the lower casing edge from the base plate or the fuel assembly foot and to leave only asymmetrically disposed bypass apertures open, can also be employed with other fuel assembly structure.

We claim:

1. A fuel assembly for a boiling water reactor, comprising:
   a) an encompassing casing having open upper and lower ends and having a rotationally symmetrical regular polygonal cross section with walls defining sides;
   b) a transition member having a lower end tapering like a funnel to form an inlet, having an upper edge engaging said lower end of said casing from below and having an interior, said transition member being secured to said lower end of said casing on all of said sides;
   c) an insert protruding into said casing from said upper end of said casing as far as said transition member, said insert having:
      i) a coolant channel with upper and lower ends,
      ii) a head piece with a handle to which said upper end of said coolant channel is secured and with a cover plate retained on at least one of said handle and said coolant channel,
      iii) a perforated base plate being secured to said lower end of said coolant channel, being seated on said upper edge of said transition member and having an upper plane and lateral surfaces, and
      iv) a bundle of fuel rods retained between said base plate and said cover plate; and
   d) each of said sides of said casing having at least one lateral bypass aperture formed therein below said upper plane of said base plate, said bypass aperture in at least one of said sides communicating with said interior of said transition member through a flow channel formed by at least one of said transition member and said base plate and said bypass aperture in at least another of said sides being blocked by one of said lateral surfaces of said base plate.

2. The fuel assembly according to claim 1, wherein each of said sides of said casing has a center line, and each of said bypass apertures is disposed in the vicinity of a respective one of said center lines.

3. The fuel assembly according to claim 1, wherein said upper edge of said transition member has contact surfaces, and each of said sides of said casing is virtually tightly connected to a respective one of said contact surfaces.

4. The fuel assembly according to claim 1, wherein said upper edge of said transition member has contact surfaces, each of said sides of said casing has a center line, and each of said sides of said casing is screwed to a respective one of said contact surfaces in the vicinity of said respective center line.

5. The fuel assembly according to claim 1, wherein said base plate has support feet resting on said upper edge of said transition member, at least one of said support feet has a recess formed therein for forming said flow channel, and at least one other of said support feet has said lateral surface for blocking said bypass aperture.

6. The fuel assembly according to claim 1, wherein said coolant channel is surrounded on all sides by said fuel rods of said cluster.

7. A fuel assembly for a boiling water reactor, comprising:
   a) a cluster of fuel rods;
   b) a rotationally symmetrical polygonal casing surrounding said cluster of fuel rods and having an open lower end, walls and an exterior;
   c) a transition member having a plurality of lateral walls forming an interior, an exterior, a lower end tapering to form an inlet, an upper part engaging said open lower end of said casing from below, and bearing surfaces resting virtually form-lockingly against all of said walls of said casing, said walls of said casing together with respective lateral walls of said transition member forming side walls of the fuel assembly;
   d) a head piece having a perforated cover plate and covering said open upper end of said casing above said cluster of fuel rods;
   e) a perforated base plate covering said open lower end of said casing below said fuel rods; and
   f) at least one of said side walls of the fuel assembly being formed with at least one unblocked lateral flow aperture guiding a bypass flow from said interior of said transition member to said exterior of the casing and of said transition member, for permitting only a part of said walls of said casing to be traversed by the bypass flow and at least one other of said side walls of the fuel assembly being substantially sealed off against the transverse flow.

8. The fuel assembly according to claim 7, wherein said walls of said casing are secured to said bearing surfaces of said transition member.

9. The fuel assembly according to claim 7, wherein said walls of said casing are disconnectably secured to said bearing surfaces of said transition member.

10. The fuel assembly according to claim 7, wherein all of said casing walls have bypass apertures formed therein being rotationally symmetrically offset from one another by 90 degrees, said base plate has outer surfaces contacting said walls of said casing for blocking only some of said bypass apertures and at least one other of said bypass apertures is unblocked and acts as said at least one lateral flow aperture.

11. The fuel assembly according to claim 7, wherein all of said casing walls have bypass apertures formed therein being rotationally symmetrically offset from one another by 90 degrees, said base plate has downwardly-protruding projections for blocking only some of said bypass apertures and at least one other of said bypass apertures is unblocked and acts as said at least one lateral flow aperture.

12. The fuel assembly according to claim 10, wherein a first group of said bypass apertures is blocked in a first relative position of said casing and said base plate, said bypass apertures are unblocked in a second relative position of said casing and said base plate, and a different group of said bypass apertures is blocked in said second relative position and unblocked in said first relative position, said second relative position being angularly offset from said first relative position and being dictated by a symmetry of the fuel assembly.

13. The fuel assembly according to claim 11, wherein a first group of said bypass apertures is blocked in a first relative position of said casing and said base plate, and a different group of said bypass apertures is blocked in a second relative position of said casing and said base plate being angularly offset from said first relative position and being dictated by a symmetry of the fuel assembly.

* * * * *